United States Patent
Ma et al.

(10) Patent No.: US 10,503,481 B2
(45) Date of Patent: Dec. 10, 2019

(54) GENERATING A NATIVE ACCESS PLAN FOR DYNAMIC ENTITY CALLING

(71) Applicant: Sybase, Inc., Dublin, CA (US)

(72) Inventors: Xiaobin Ma, Dublin, CA (US); Xun Cheng, Dublin, CA (US)

(73) Assignee: Sybase, Inc., Dublin, CA (US)

( * ) Notice: Subject to any disclaimer, the term of this patent is extended or adjusted under 35 U.S.C. 154(b) by 45 days.

(21) Appl. No.: 14/971,695

(22) Filed: Dec. 16, 2015

(65) Prior Publication Data

US 2017/0177303 A1 Jun. 22, 2017

(51) Int. Cl.
*G06F 8/30* (2018.01)
*G06F 8/41* (2018.01)

(52) U.S. Cl.
CPC . *G06F 8/30* (2013.01); *G06F 8/41* (2013.01)

(58) Field of Classification Search
CPC .................................. G06F 8/30; G06F 8/41
See application file for complete search history.

(56) References Cited

U.S. PATENT DOCUMENTS

| | | | |
|---|---|---|---|
| 6,901,591 B1 | 5/2005 | Sokolov | |
| 8,954,418 B2 | 2/2015 | Faerber et al. | |
| 9,026,525 B2 | 5/2015 | Harren et al. | |
| 9,047,101 B2 | 6/2015 | Cabillic et al. | |
| 2004/0255268 A1 | 12/2004 | Meijer et al. | |
| 2009/0083219 A1* | 3/2009 | Zane | G06F 8/30 |
| 2011/0295838 A1* | 12/2011 | Collins | G06F 17/30463 707/715 |
| 2014/0365533 A1* | 12/2014 | Debray | G06F 17/30474 707/803 |
| 2015/0032722 A1* | 1/2015 | Al-Omari | G06F 17/30463 707/718 |
| 2015/0186166 A1 | 7/2015 | Jennings et al. | |
| 2017/0031986 A1* | 2/2017 | Li | G06F 17/30463 |

* cited by examiner

*Primary Examiner* — Wei Y Zhen
*Assistant Examiner* — Amir Soltanzadeh
(74) *Attorney, Agent, or Firm* — Sterne, Kessler, Goldstein & Fox P.L.L.C.

(57) ABSTRACT

Disclosed herein are system, method, and computer program product embodiments for generating a native access plan from a query execution plan for dynamic entity calling. An embodiment operates by receiving the query execution plan comprising at least one call to an entity, the entity being implemented by a plurality of classes, and generating source code of a native access plan that implements the query execution plan. The source code of the native access plan includes instructions to translate a run-time call to the entity to a call to a corresponding implementation of the entity based on an identifier of the called implementation of the entity.

18 Claims, 5 Drawing Sheets

GENERATING A NATIVE ACCESS PLAN FOR DYNAMIC ENTITY CALLING

BACKGROUND

Generally, an entity, such as a virtual function or variable, having a uniform interface can be called to dynamically bind one of potentially many implementations at run-time instead of at compilation time. Database systems may use dynamically-bound entities to implement query execution plans that employ certain techniques instead of others based on information available at run-time. However, some intermediate representation languages (such as that used by a Low-Level Virtual Machine (LLVM)) are not object-oriented and do not support the concept of a dynamically-bound entities. Thus, database systems that use these intermediate representation languages to implement query execution plans can suffer from the unavailability of dynamic entities.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for generating a native access plan for dynamic entity calling.

Figure 1:
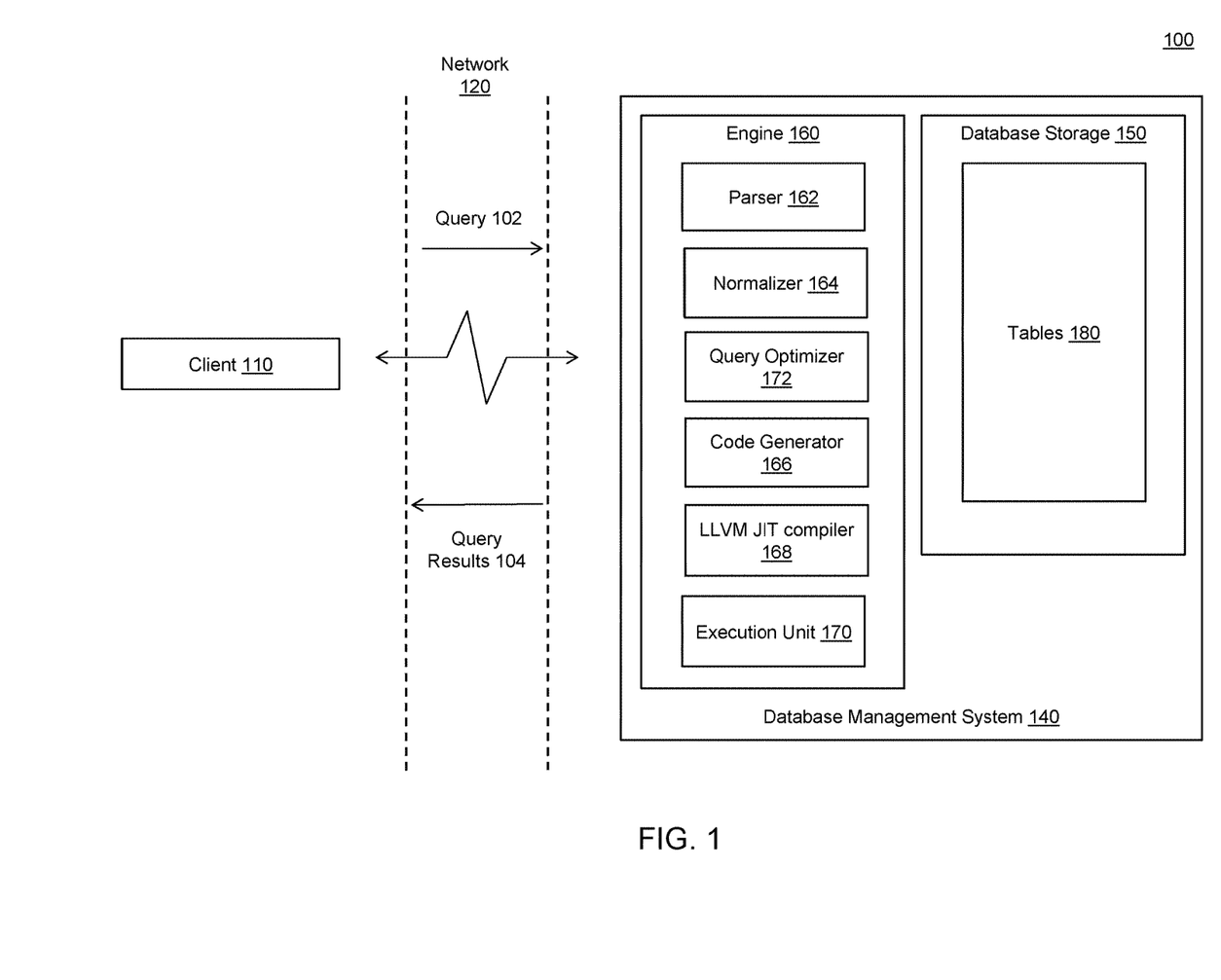
FIG. 1 is a block diagram of a database system for generating a native access plan for dynamic entity calling, according to an example embodiment.

FIG. 1 is a block diagram of a database system 100 for generating an intermediate representation code for dynamic entity calling, according to an example embodiment. Database system 100 includes a database management system (DBMS) 140 and client 110 that communicates with DBMS 140. DBMS 140 can be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. Client 110 can request access to DBMS 140. Additionally, both client 110 and DBMS 140 can execute within a computer system, such as an example computer system discussed in FIG. 5.

Client 110 and DBMS 140 can communicate over network 120. Network 120 can be any wired and/or wireless network or combination of wired and/or wireless networks that can carry data communications. Such a network 120 can include, but is not limited to, a wired and/or wireless local area network, metropolitan area network, and/or wide area network that includes the Internet.

A relational database is a collection of data items organized as a set of formally-described tables from which data can be accessed or reassembled in many different ways without having to reorganize the database tables. A relational database employs a set of tables containing data fitted into predefined categories.

In an embodiment, the rows and/or columns are stored in one or more of tables 180. Any combination of the rows and/or columns of tables 180 can be stored compressed or uncompressed in tables 180. That data in tables 180 can be compressed using row compression, page-dictionary compression, page-index compression, column compression, or any combination thereof. Compressed rows and/or columns of tables 180 can each be compressed with different compression types. The rows and/or columns of table 180 can be stored in memory.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but can be another query language, such as SQL Script (a scripting language for describing application specific calculations inside the database), a MultiDimensional eXpressions (MDX), WIPE (weakly structure information processing and exploration) for data graph processing and FOX (for planning applications), to give a few examples. DBMS 140 is able to interpret query 102 in accordance with the query language and, based on the interpretation, generate requests to database storage 150.

Query 102 can be generated by a user using client 110 or by an application executing on client 110. Upon receipt, DBMS 140 begins to process query 102. Once processed, the result of the processed query is transmitted to client 110 as query result 104.

In an embodiment, query 102 includes one or more sub-queries. A sub-query is a query included within another query. Any sub-query may comprise one or more sub-queries.

In an embodiment, to process query 102, DBMS 140 may include engine 160, which may include a parser 162, a normalizer 164, a code generator 166, a Low-Level Virtual Machine (LLVM) Just-in-Time (JIT) compiler 168, an execution unit 170, a query optimizer 172, or any combination thereof.

Parser 162 parses the received queries 102. In an embodiment, parser 162 converts query 102 into a binary tree data structure which represents the format of query 102. In other embodiments, other types of data structures are used.

When parsing is complete, parser 162 passes the parsed query to a normalizer 164. Normalizer 164 normalizes the parsed query. For example, normalizer 164 eliminates redundant SQL constructs from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to query optimizer 172. Query optimizer 172 analyzes the query and determines a query plan for executing the query. The query plan retrieves and manipulates information in the database storage 150 in accordance with the query semantics. This can include choosing the access method for each table accessed, choosing the order in which to perform a join operation on the tables, and choosing the join method to be used in each join operation. As there can be multiple strategies for executing a given query using combinations of these operations, query optimizer 172 generates and evaluates a number of strategies from which to select the best strategy to execute the query.

In an embodiment, query optimizer 172 generates multiple query plans. Once generated, query optimizer 172 selects a query plan from the multiple query plans to execute the query. The selected query plan may be a cost efficient plan, a query plan that uses the least amount of memory in DBMS 140, a query plan that executes the quickest, or any combination of the above, to give a few examples. In an embodiment, the selected query plan may be the query plan that invokes the least Input/Output accesses, which may be executed the fastest, particularly when the Input/Output accesses involve compression and decompression operations.

After processing the query plan, query optimizer 172 forwards the processed query plan to code generator 166. Code generator 166 compiles the processed query plan into source code of a native access plan. The compilation process determines how query 102 is executed by DBMS 140. LLVM JIT compiler unit 168 converts the source code of the native access plan generated by code generator 166 into intermediate representation code and native executable binary code. Execution unit 170 receives the native executable binary code and executes it to produce query results 104.

In an embodiment, LLVM JIT compiler unit 168 converts the source code of the native access plan generated by code generator 166 into intermediate representation code and native executable binary code. Intermediate representation code can be used to generate object or machine code in a machine-readable format for a target machine. Intermediate representation code can be run using an interpreter or compiled using a compiler, such as a Just-In-Time (JIT) compiler, into native code. In an embodiment, LLVM JIT compiler 168 converts the native access plan into a Low-Level Virtual Machine (LLVM) intermediate representation. For example, LLVM JIT compiler 168 can generate intermediate representation code in accordance with the method depicted in FIGS. 2 and 4.

Figure 2:
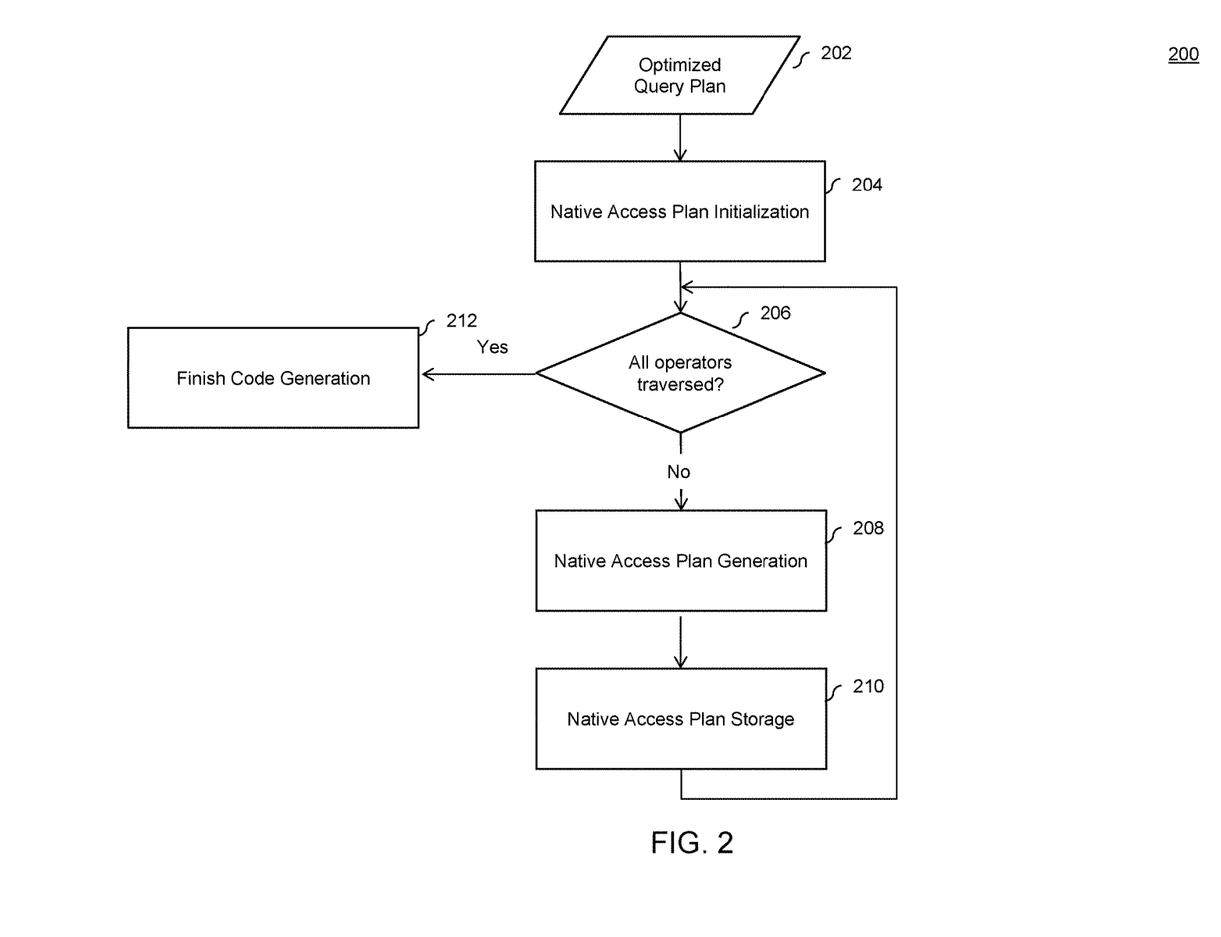
FIG. 2 is a flowchart illustrating a process for generating a native access plan, according to an example embodiment.

FIG. 2 is a flowchart for a method 200 for generating a native access plan, according to an embodiment. Method 200 can be performed by processing logic that can comprise hardware (e.g., circuitry, dedicated logic, programmable logic, microcode, etc.), software (e.g., instructions executing on a processing device), or a combination thereof.

At block 202, code generator 166 receives a query plan. In an embodiment, the received query plan comprises trees built of operators. Each operator may implement the same application program interfaces (APIs)—for example, Acquire, Open, Next, Close and Release, to name a few. Further, the query plan may be a consumer-driven model—i.e. the query plan is driven by its top-most operator.

At block 204, code generator 166 performs initializations to prepare for native access plan generation. According to an embodiment, these initializations may comprise generating an native access plan module for a compiled native access plan, generating a function signature for a compiled native access plan, generating blocks for a native access plan, generating structure types and constants used by code generator 166, retrieving and storing variables, and/or any combination thereof.

At block 206, code generator 166 traverses operators in the trees of the query plan. Code generator 166 may generate the source code of the native access plan for the operators of the query plan as detailed at block 208. In an embodiment, block 206 determines whether all of the operators of the query plan have been traversed and/or processed. If it is determined that all of the operators have been traversed, method 200 proceeds to block 212.

In an embodiment, code generator 166 traverses the trees of the query plan from a root node and generates the native access plan based upon the traversal.

At block 208, code generator 166 generates the native access plan based upon the operators of the query plan. In an embodiment, code generator 166 generates the source code of the native access plan in a bottom-up post order. For example, when code generator 166 traverses a Nested Loop Join (NLJ) in the query execution plan, code generator 166 first generates source code of the native access plan for the left child of the NLJ, then the right child of the NLJ, and then the parent of the NLJ. In this example, the source code of the native access plan is first produced for the child operators before generating the source code of the native access plan for the parent operator. The native access plan for the parent operator may be generated by calling or consuming the source code of the native access plan of the child operators. Code generator 166 may repeat this bottom-up post order of source code of the native access plan until all operators of the query plan have been traversed.

According to an embodiment, when an operator of the query plan is traversed, code generator 166 can generate source code of the native access plan based upon the operator traversed according to a member function. For example, for each operator in the query plan, there may be a set of functions that source code of the native access plan based on the functionalities of the operator according to a member function. This set of functions and member function may be stored in a class.

Figure 4:
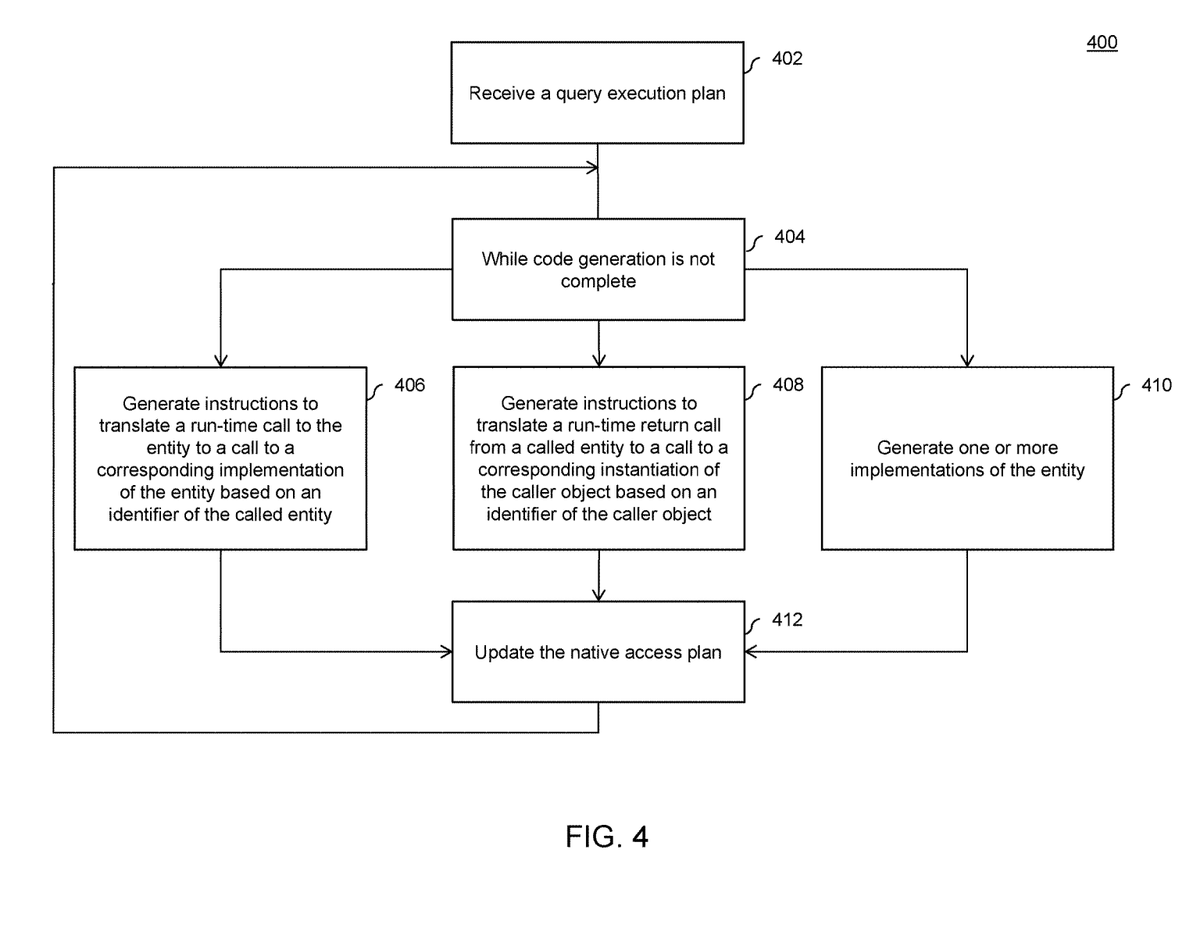
FIG. 4 is a flowchart illustrating a process for generating a native access plan for dynamic entity calling, according to an example embodiment.

In an embodiment, code generator 166 generates the code based on the operators according to the method 400 described regarding FIG. 4.

At block 210, after code generator 166 has generated source code of the native access plan for an operator, the source code of the native access plan may be placed in blocks generated during initialization, according to an embodiment. In an embodiment, these blocks are placed in vectors.

In an embodiment, after the source code of the native access plan has been generated for a child operator, the source code of the native access plan is placed in a temporary storage. When generating source code of the native access plan for the child's parent operator, the source code of the native access plan from the child operator is recalled and stored in a block generated during initialization.

According to an embodiment, once source code of the native access plan has been generated for a parent operator, the source code of the native access plan generated from the parent's child operator may be removed from temporary storage.

At block 212, code generator 166 finishes the code generation by placing generated source code into the native access plan. In an embodiment, after code generator 166 has finished generating source code of the native access plan for some or all parent operators, blocks comprising source code of the native access plan generated from a parent's child operator may be removed from a vector containing a block comprising source code of the native access plan generated from the parent operator.

Figure 3:
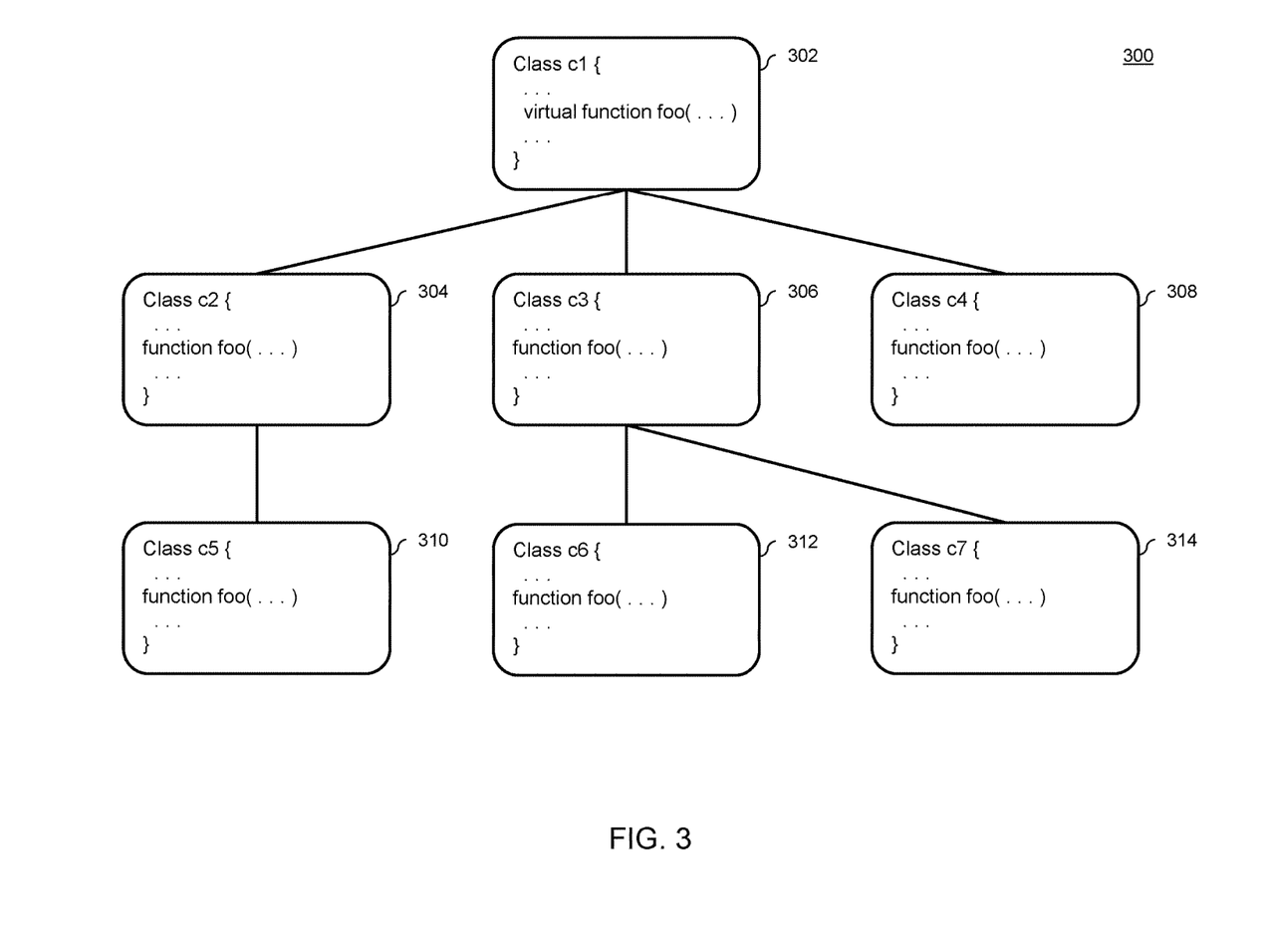
FIG. 3 is a block diagram illustrating an example class hierarchy, according to an example embodiment.

FIG. 3 is a block diagram of an example class hierarchy 300, according to an example embodiment. Class hierarchy 300 includes example classes c1-c7 (labeled 302, 304, 306, 308, 310, 312, and 314, respectively). Class c1 is a parent class of classes c2-c4. Class c2 is the parent of class c5. Class c3 is the parent of classes c6 and c7.

In the example of FIG. 3, class c1 defines a virtual function foo( ), although the example in FIG. 3 is not limited to a virtual function, as discussed further below. The function foo( ) can include zero or more arguments and can return one or more values. In example class hierarchy 300, each of classes c2-c7 implements its own respective version of the function foo( ), which contains the same number and type of arguments and return values as function foo( ) of class c1. Although class hierarchy 300 is shown having seven classes in this particular configuration, embodiments of the invention are not limited thereto and are applicable to a class hierarchy including any number, type, or arrangement of classes. Although virtual functions are shown in the example of FIG. 3, embodiments of the invention are not limited thereto and are applicable to any type of call or reference to any type of virtual entities, such as virtual variables, class members, operators, any run-time-determined call or reference, etc. For example, a variable can be used to index children operators of an operator in the query plan, and the variable can be used as an iterator to call functions corresponding to the children operators at run-time. However, the number of children can be dynamic for n-ary operators, and as a result, the value of the variable may not be able to be determined until run-time. Thus, in this example, there is a need to post-phone the determination of the child operator being called until run-time.

Class hierarchy 300 illustrates the complexity caused by using virtual entities. For example, an object can defined at compile time to be of class type c1. Calling function foo( ) from this object could result in a calling the function foo( ) of any of classes c1 through c7 depending on the type of the object, the type being determined at run-time. Similarly, a function call could potentially return to one or more different callers because of the virtual functions. As yet another example, there are several other reasons why values may not be able to be determined until run-time, such as when identifying function calls to children or parent operators when traversing a query tree. For example, for n-ary operators, the number of arguments or operands may not be known and/or specified until the operator is called at run-time. This complexity can be present for any virtual or run-time-determined entity type.

Figure 5:
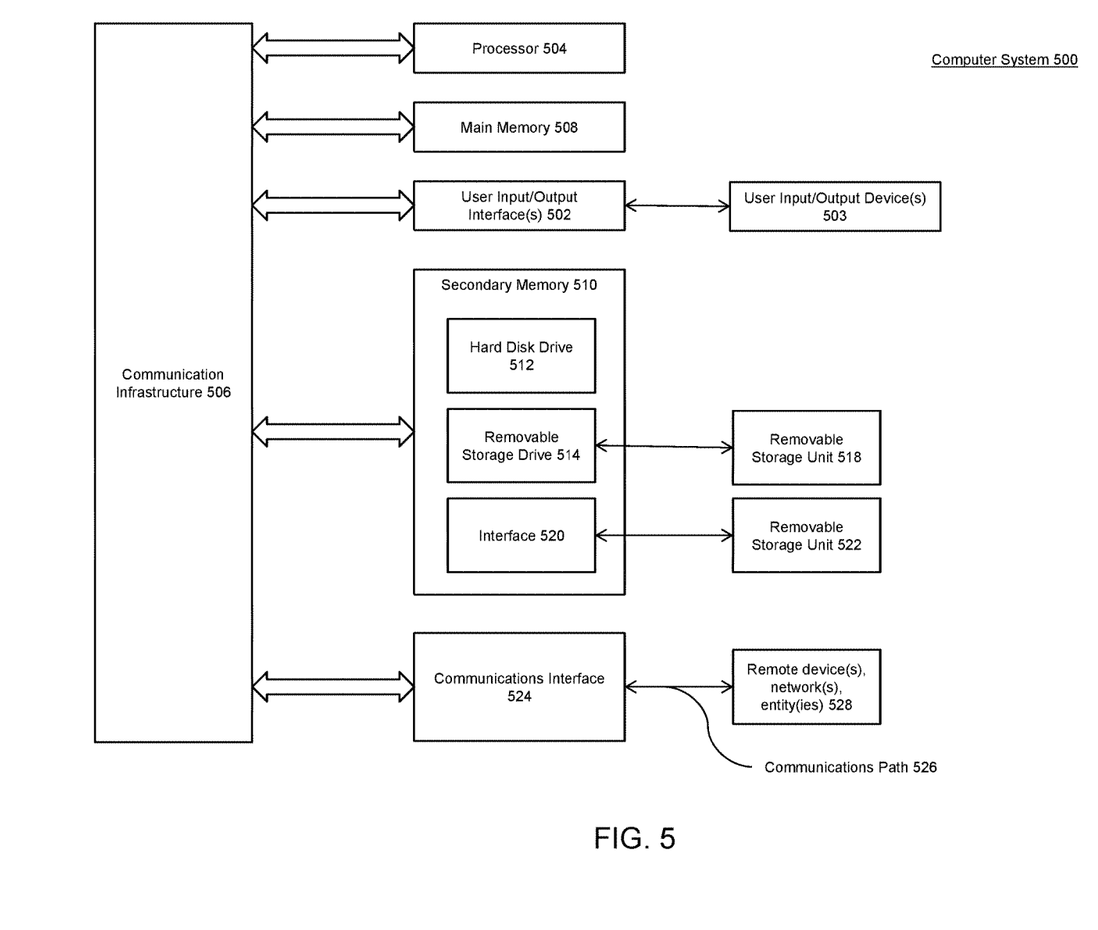
FIG. 5 is an example computer system useful for implementing various embodiments.

FIG. 4 is a flowchart for a method 400 for generating a native access plan for dynamic entity calling, according to an embodiment. Method 400 can be performed by processing logic that can comprise hardware (e.g., circuitry, dedicated logic, programmable logic, microcode, etc.), software (e.g., instructions executing on a processing device), or a combination thereof. In an embodiment, method 400 is performed by code generator 166, which can be implemented by a computer system such as computer system 500.

At block 402, all or a portion of a query execution plan is received. In an embodiment, code generator 166 receives all or a portion of the query execution plan.

At block 404, it is determined whether generation of the native access plan is complete. In an embodiment, code generator 166 determines whether generation of the native access plan is complete. In an embodiment, native access plan generation may not be complete if (1) there is at least one call to an entity in the received section of the query execution plan that has not been processed according to block 406; (2) there is at least one return call from a called entity that has not been processed according to block 408; (3) there is at least one implementation of an entity that has not been generated as source code of the native access plan; (4) or any combination or sub-combination thereof. Method 400 can proceed to blocks 406, 408, or 410 if it is determined that code generation is not complete. If it is determined that code generation is complete, method 400 can end and return any generated source code of the native access plan.

At block 406, instructions are generated to translate a run-time call to the entity into a call to a corresponding implementation of the entity based on an identifier of the called entity. In an embodiment, code generator 166 generates the instructions to translate a run-time call to a call to a corresponding implementation of the entity based on an identifier of the called entity. In an embodiment, code generator 166 stores the address of an entry block of the children's entities in a global variable at compile time. Code generator 166 can also generate instructions so that at run time, the proper child's entity is called by jumping to the address of the block at run time based on run-time data. For example, the address of the block can be stored in an array, and an indirect branch operation (such as LLVM's indirect branch instruction) can be used to jump to the array indexed by the run-time data.

In an embodiment, generating the instructions to translate a run-time call to the entity into a call to a corresponding implementation of the entity based on an identifier of the called entity occurs as follows. A first data structure (such as an address array) is generated to hold addresses of the entry block of all of the implementations of an entity. The following table illustrates an example first data structure, in which the identifier of an entity is an index to the corresponding address of the entity's entry block.

TABLE 1

Example First Data Structure of Entry Addresses

| Entity Index | Entry Address |
|---|---|
| 0 | $Address_0$ |
| 1 | $Address_1$ |
| 2 | $Address_2$ |
| ... | ... |
| n | $Address_n$ |

A second data structure (such as a global variable) can be generated to hold the first data structure in the native access plan. One or more instructions to determine the address of the entry block of the appropriate entity based on run-time data (e.g. an index of the entity in the first data structure) can be generated. An indirect branch instruction can be generated to use the determined address to jump to the entry block address of an entity's implementation. Further, entry blocks of all children's next entity can be added as destinations of indirect branch instruction so that the indirect branch instruction can jump to proper destination depending on the run-time data.

At block 408, instructions are generated to translate a run-time return call from a called entity to a call to a corresponding instantiation of the caller object based on an identifier of the caller object. In an embodiment, code generator 166 generates instructions to translate a run-time return call from a called entity to a call to a corresponding instantiation of the caller object based on an identifier of the caller object. In an embodiment, code generator 166 stores the address of a return block of the parent's entities in a global variable at compile time. Code generator 166 can also generate instructions so that at run time, the proper caller is returned to by jumping to the address of the block at run time based on run-time data. For example, the address of the return block can be stored in an array, and an indirect branch operation (such as LLVM's indirect branch instruction) can be used to jump to the array indexed by the run-time data. The run-time data can be a value assigned to source blocks of the generated intermediate representation entity callers. The instructions can be configured to provide at run-time that assigned value for performing a lookup of the appropriate caller return address.

In an embodiment, generating the instructions to translate a run-time return call from a called entity to a call to a corresponding instantiation of the caller object based on an identifier of the caller object occurs as follows. A first data structure (such as an address array) is generated to hold addresses of the return blocks of callers of the entity. The following table illustrates an example first data structure, in which the identifier of the entity is an index to the corresponding address of the entity's return block.

TABLE 2

Example First Data Structure of Return Addresses

| Parent Index | Return Address |
|---|---|
| 0 | $Address_0$ |
| 1 | $Address_1$ |
| 2 | $Address_2$ |
| ... | ... |
| m | $Address_m$ |

A second data structure (such as a global variable) can be generated to hold the first data structure in the native access plan. One or more instructions to determine at run-time the addresses of the return blocks from the global variable as destinations of an indirect branch can be generated. Data, such as node or caller identifiers, can be created in the native access plan. One or more instructions for receiving a value from values of multiple callers' source blocks when receiving an incoming entity call at run-time can be generated. The value can be used to determine the value of the return address or an index of a table storing the value of the return address. An indirect branch instruction can be generated to use the determined return address or index of the return address to jump to the return block address of a caller depending on the run-time data.

At block 410, one or more implementations of the entity are generated. In an embodiment, code generator 166 generates the one or more implementations of the entity in the native access plan.

At block 412, the native access plan is updated. In an embodiment, code generator 166 updates the native access plan by placing code generated by blocks 406, 408, or 410 into the native access plan. Method 400 then proceeds to block 404.

In an embodiment, LLVM JIT compiler 168 interprets or compiles the generated intermediate representation code to execute the query plan. Execution unit 170 can execute the compiled code generated by LLVM JIT compiler 168 and provide the results as query results 104.

Various embodiments can be implemented, for example, using one or more well-known computer systems, such as computer system 500 shown in FIG. 5. Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible apparatus or article of manufacture comprising a tangible computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 5. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for generating a native access plan from a query execution plan for dynamic entity calling, comprising:

receiving, by at least one processor, the query execution plan comprising at least one run-time call to a function, wherein the function includes a plurality of different implementations;

translating the run-time call to the function into a corresponding implementation of the function, for each of the plurality of different implementations, based on an identifier of the function;

determining, from an address array of a first data structure, entry addresses for each of the plurality of implementations of the function as included in the query execution plan, wherein at least one of the plurality of implementations of the function for which an address has been determined is not called during run-time within the query execution plan;

storing the address array, including the addresses corresponding to the subset of the plurality of implementations of the function as included in the query execution plan, in a global variable at compile time; and generating, by the at least one processor, source code of the native access plan that implements the query execution plan including the addresses of the address array.

2. The method of claim 1, wherein the native access plan further includes instructions to translate the at least one run-time return call from a called implementation of the entity to a call to a corresponding instantiation of a caller object based on an identifier of the caller object.

3. The method of claim 2, the generating further comprising: determining an address of the corresponding instantiation of the caller object using a table storing the addresses in the native access plan.

4. The method of claim 1, further comprising:
compiling, by the at least one processor, the source code of the native access plan into intermediate representation code.

5. A system, comprising:
a memory; and
at least one processor coupled to the memory and configured to:
receive a query execution plan comprising at least one run-time call to a function, wherein the function includes a plurality of different implementations;
translate the run-time call to the function into a corresponding implementation of the function, for each of the plurality of different implementations, based on an identifier of the function;
determine, from an address array of a first data structure, entry addresses for each of the plurality of implementations of the function as included in the query execution plan, wherein at least one of the plurality of implementations of the function for which an address has been determined is not called during run-time within the query execution plan;
store the address array, including the addresses corresponding to the subset of the plurality of implementations of the function as included in the query execution plan, in a global variable at compile time; and
generate source code of the native access plan that implements the query execution plan including the addresses of the address array.

6. The system of claim 5, wherein the source code of the native access plan further includes instructions to translate the at least one run-time return call from a called implementation of the entity to a call to a corresponding instantiation of a caller object based on an identifier of the caller object.

7. The system of claim 6, wherein to generate the source code of the native access plan the at least one processor is configured to:
determine an address of the corresponding instantiation of the caller object using a table storing the addresses in the native access plan.

8. The system of claim 5, wherein the source code of the native access plan further includes the implementation of the entity.

9. The system of claim 5, wherein the source code of the native access plan does not natively support dynamically-bound entities.

10. The system of claim 5, the at least one processor further configured to: compile the source code of the native access plan into intermediate representation code.

11. A non-transitory computer-readable device having instructions stored thereon that, when executed by at least one computing device, causes the at least one computing device to perform operations comprising:
receiving a query execution plan comprising at least one run-time call to a function, wherein the function includes a plurality of different implementations, translating the run-time call to the function into a corresponding implementation of the function, for each of the plurality of different implementations, based on an identifier of the function;
determining, from an address array of a first data structure, entry addresses for each of the plurality of implementations of the function as included in the query execution plan, wherein at least one of the plurality of implementations of the function for which an address has been determined is not called during run-time within the query execution plan;
storing the address array, including the addresses corresponding to the subset of the plurality of implementations of the function as included in the query execution plan, in a global variable at compile time; and
generating, by the at least one processor, source code of the native access plan that implements the query execution plan including the addresses of the address array.

12. The computer-readable device of claim 11, wherein the source code of the native access plan further includes instructions to translate the at least one run-time return call from a called implementation of the entity to a call to a corresponding instantiation of a caller object based on an identifier of the caller object.

13. The computer-readable device of claim 12, the generating comprising:
determining an address of the corresponding instantiation of the caller object using a table storing the addresses in the native access plan.

14. The computer-readable device of claim 11, wherein the source code of the native access plan does not natively support dynamically-bound entities.

15. The method of claim 1, wherein the function is a virtual function, and wherein each implementation corresponds to one of a plurality of classes of the virtual function.

16. The method of claim 1, wherein the generating comprises generating source code of the native access plan that jumps to a corresponding address of one of the subset of implementations based on run-time data.

17. The method of claim 1, wherein the determined addresses are stored in a first data structure, and second data structure holds the first data structure and one or more addresses determined during the run-time.

18. The method of claim 1, further comprising:
determining, from an address array, return addresses for the plurality of implementations of the function to which to return.

* * * * *